United States Patent
Cibien

(10) Patent No.: US 9,759,320 B2
(45) Date of Patent: Sep. 12, 2017

(54) COMPACT CLUTCH

(71) Applicant: BI.CI.DI. SRL, San Colombano al Lambro (IT)

(72) Inventor: Angelo Cibien, San Colombano al Lambro (IT)

(73) Assignee: BI.CI.DI. SRL, San Colombano al Lambro (MI) (IT)

( * ) Notice: Subject to any disclaimer, the term of this patent is extended or adjusted under 35 U.S.C. 154(b) by 0 days.

(21) Appl. No.: 15/198,220

(22) Filed: Jun. 30, 2016

(65) Prior Publication Data

US 2016/0369892 A1    Dec. 22, 2016

Related U.S. Application Data

(63) Continuation-in-part of application No. 14/848,847, filed on Sep. 9, 2015, now Pat. No. 9,556,957.

(30) Foreign Application Priority Data

Sep. 15, 2014   (IT) .......................... MI2014A001587

(51) Int. Cl.
   *F16H 57/00*     (2012.01)
   *F16H 63/04*     (2006.01)
   (Continued)

(52) U.S. Cl.
   CPC ......... *F16H 63/04* (2013.01); *A01D 34/6812* (2013.01); *B60B 35/122* (2013.01);
   (Continued)

(58) Field of Classification Search
   CPC .... F16H 63/04; F16H 1/02; F16H 2063/3093; F16D 13/025; F16D 19/00
   See application file for complete search history.

(56) References Cited

U.S. PATENT DOCUMENTS 1,968,155 A    7/1934  Litchfield
3,493,088 A    2/1970  Hoff
               (Continued)

FOREIGN PATENT DOCUMENTS

FR    2833674 A1    6/2003
IT    1311501 B1    3/2002
               (Continued)

OTHER PUBLICATIONS

Italian Patent Application No. MI20141587, Search Report and Written Opinion mailed May 18, 2015, 7 pages.

*Primary Examiner* — Zakaria Elahmadi
(74) *Attorney, Agent, or Firm* — Fredrikson & Byron, P.A.

(57) ABSTRACT

A compact clutch including a driven shaft on which the following are mounted: a gear wheel; a driving bush; a driven bush; a coil spring; a first collar with cam surfaces; and a second collar with cam surfaces. The gear wheel and the bushes are arranged axially next to each other; the gear wheel and the driving bush are constrained together in the circumferential direction; the spring surrounds externally the bushes; the first collar surrounds externally the spring; and the second collar surrounds externally the first collar. The gear wheel and the bushes are constrained to the driven shaft in the axial direction by means of two stop rings; and the driven bush is constrained to the driven shaft in the circumferential direction by means of at least one tongue.

6 Claims, 13 Drawing Sheets

(51) Int. Cl.
     *F16D 19/00*     (2006.01)
     *B60B 35/12*     (2006.01)
     *F16H 1/02*     (2006.01)
     *F16H 63/30*     (2006.01)
     *A01D 34/68*     (2006.01)
     *F16D 7/04*     (2006.01)

(52) U.S. Cl.
     CPC .............. *F16D 7/044* (2013.01); *F16D 19/00* (2013.01); *F16H 1/02* (2013.01); *F16H 63/30* (2013.01); *F16H 2063/3093* (2013.01)

(56) References Cited

U.S. PATENT DOCUMENTS

| | | |
|---|---|---|
| 2005/0211527 A1 | 9/2005 | Cibien |
| 2008/0000322 A1 | 1/2008 | Hillyer |
| 2010/0101345 A1 | 4/2010 | Moore et al. |
| 2012/0048673 A1 | 3/2012 | Mellor |
| 2012/0204664 A1 | 8/2012 | Peura et al. |
| 2014/0251748 A1 | 9/2014 | McCrary |
| 2014/0345404 A1 | 11/2014 | Wu |
| 2016/0017964 A1 | 1/2016 | Yu et al. |

FOREIGN PATENT DOCUMENTS

| | | |
|---|---|---|
| JP | S6098223 A | 6/1985 |
| WO | 9534765 A1 | 12/1995 |

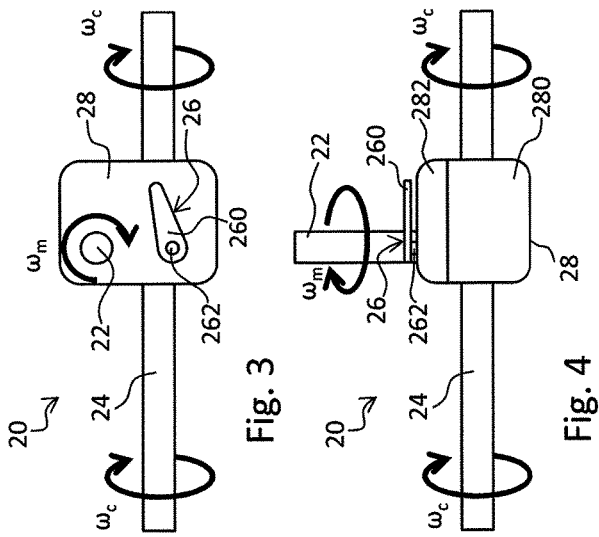
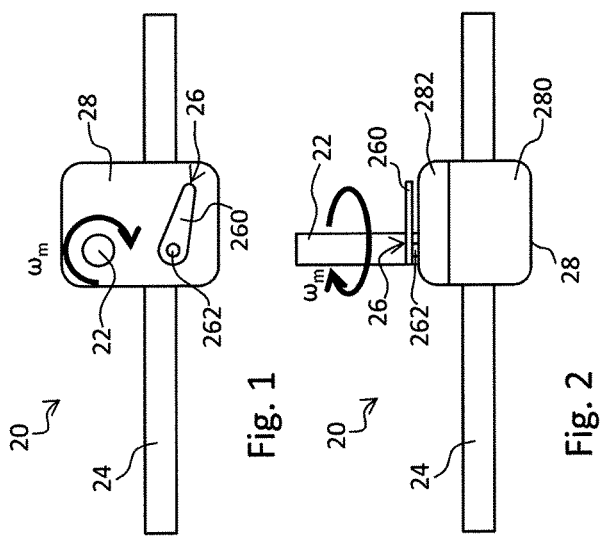
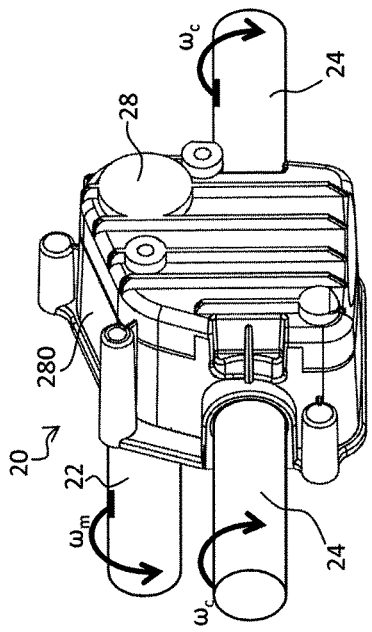

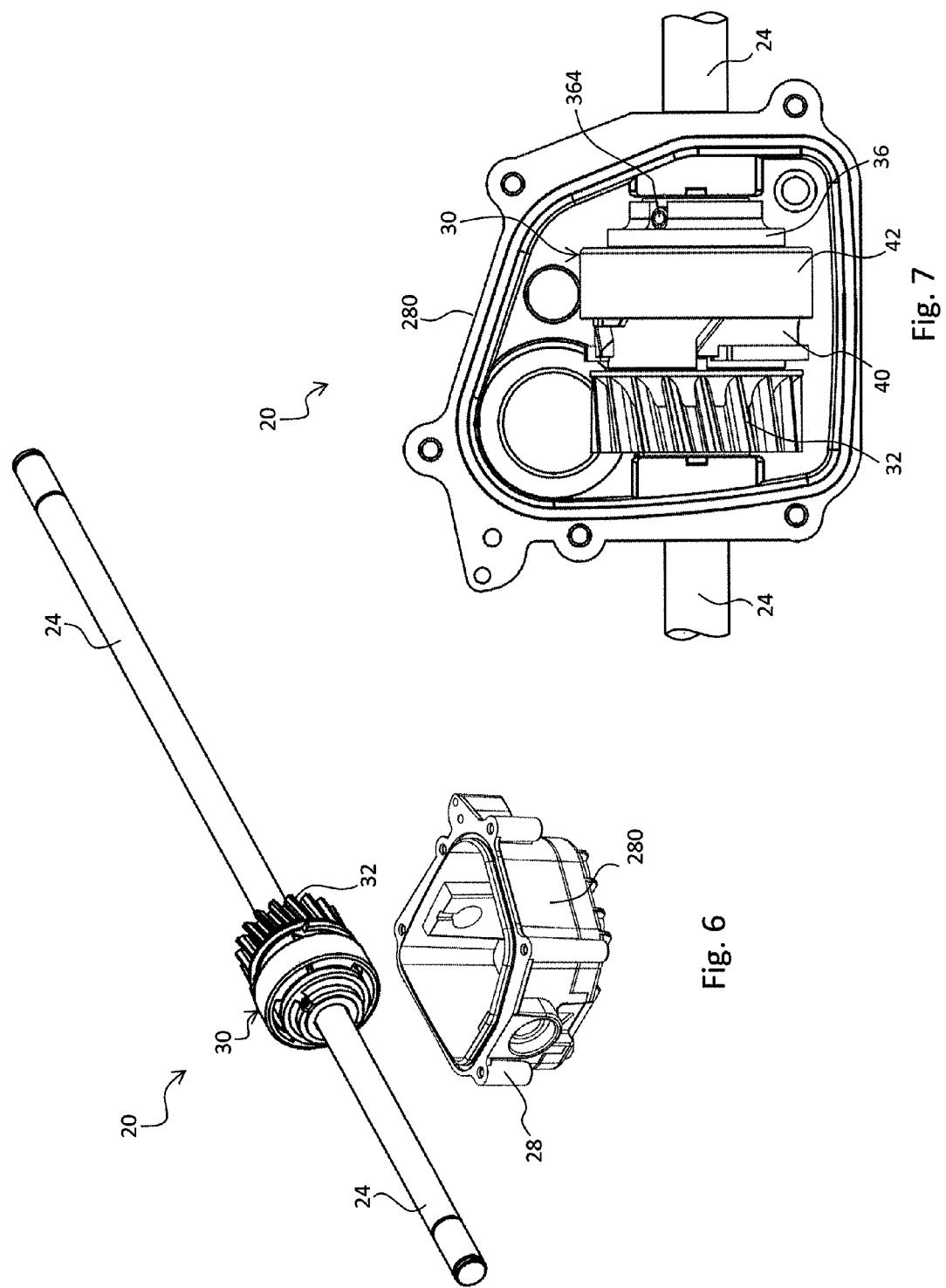

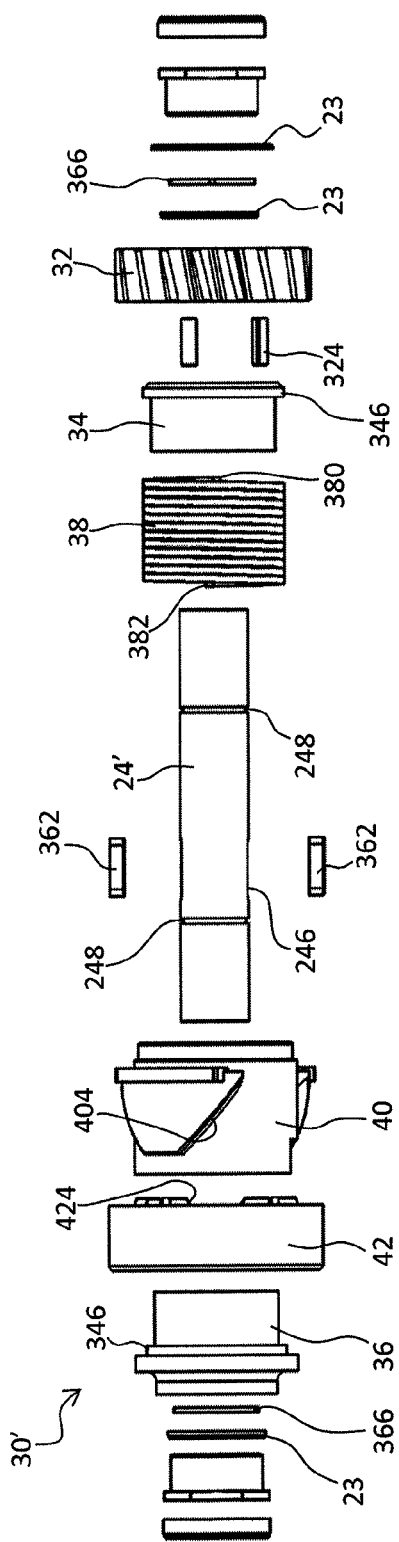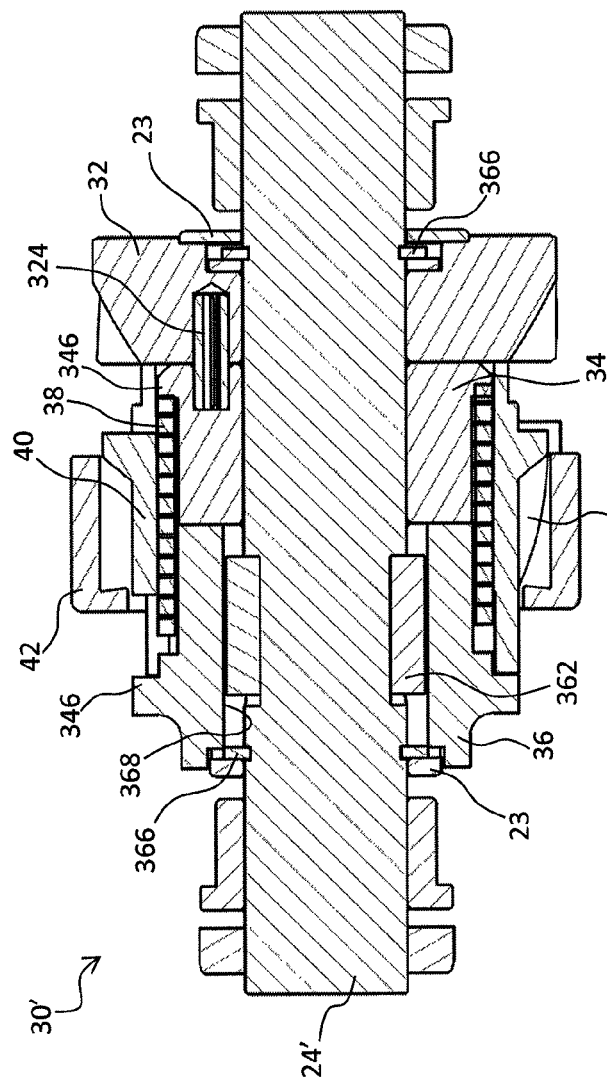

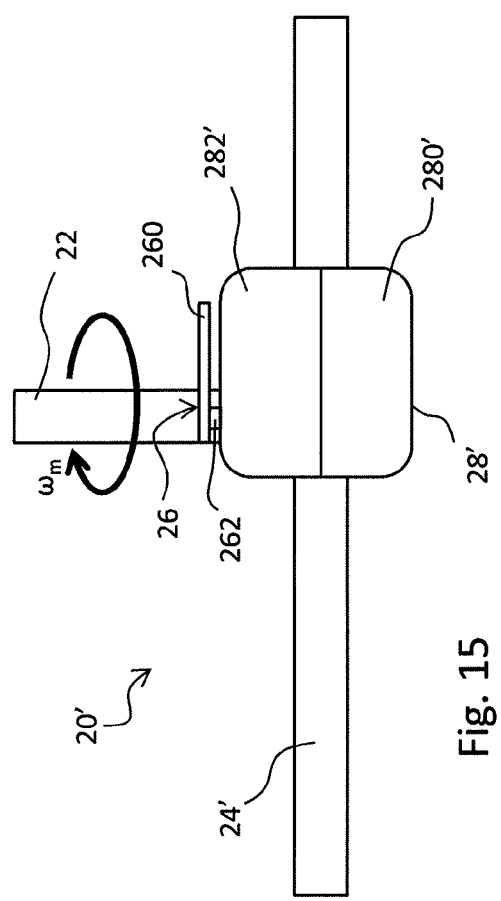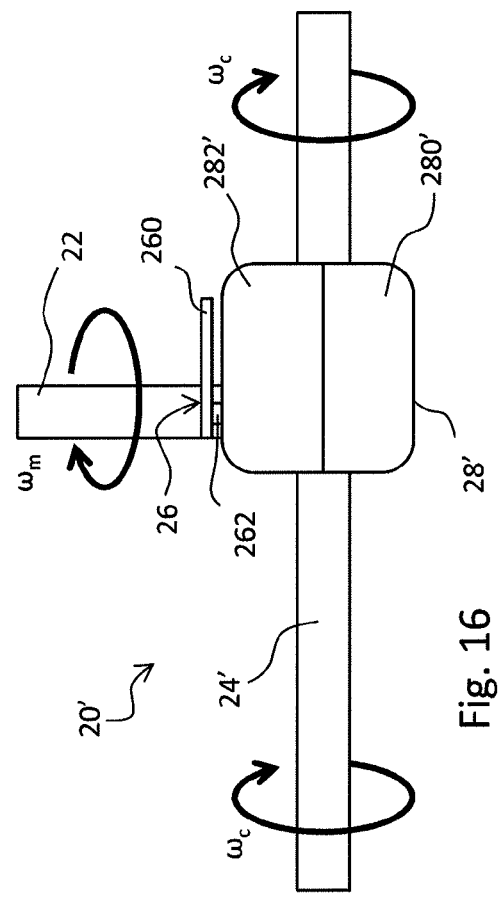

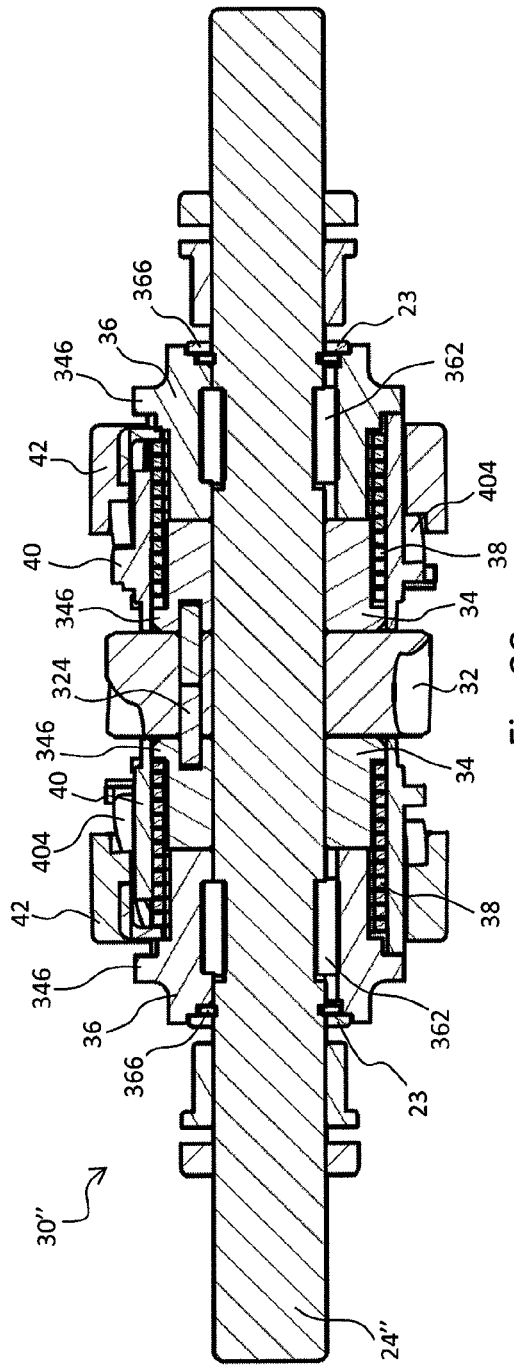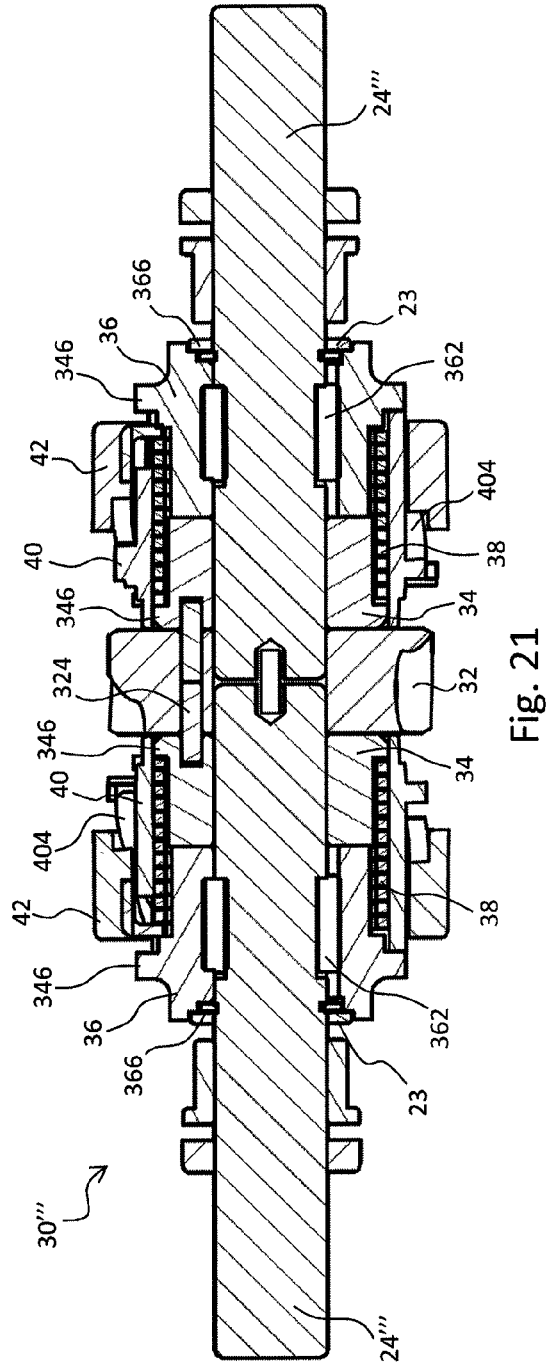

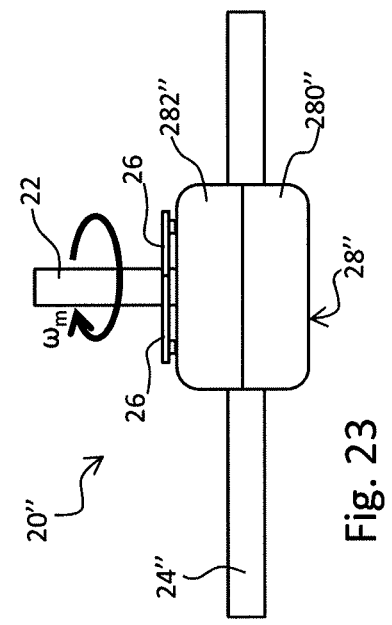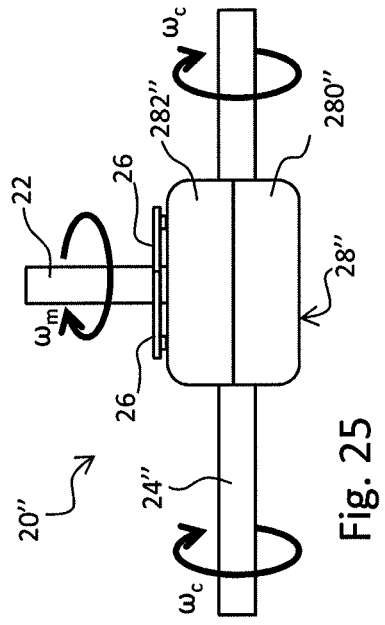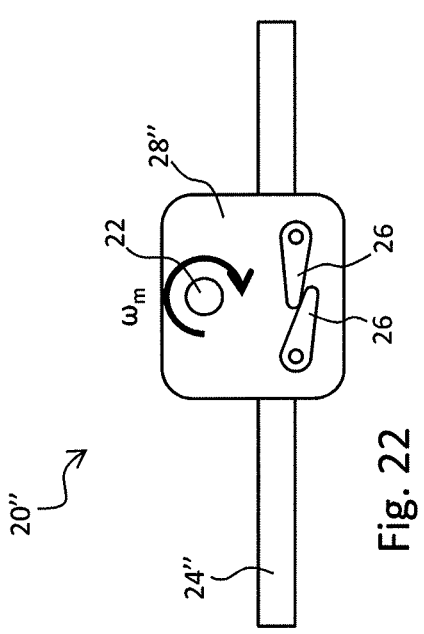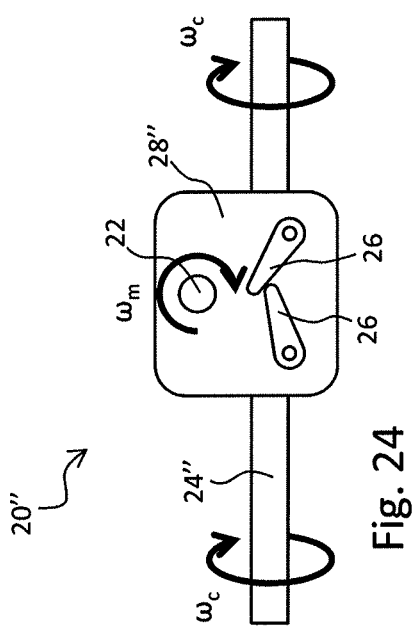
Fig. 22
Fig. 24
Fig. 23
Fig. 25

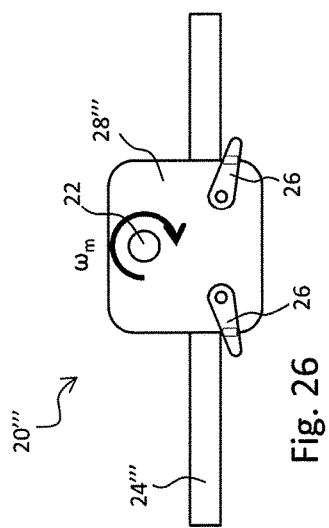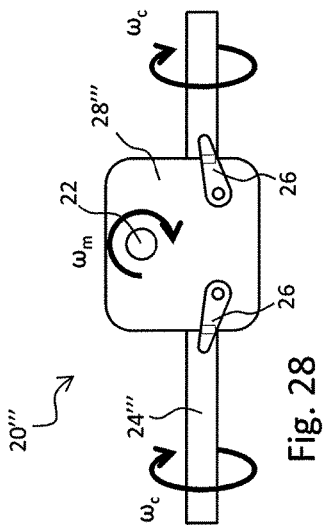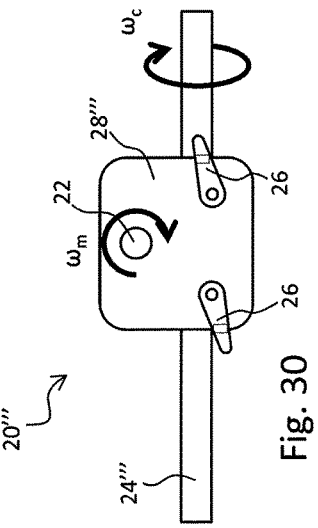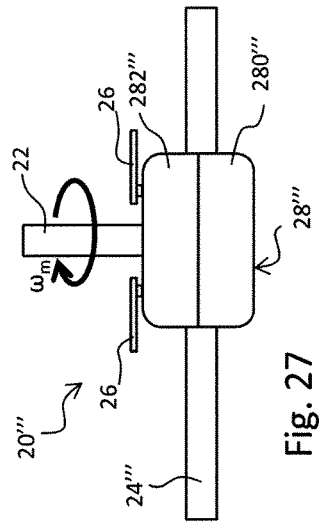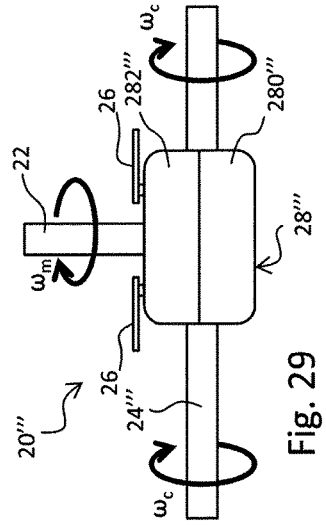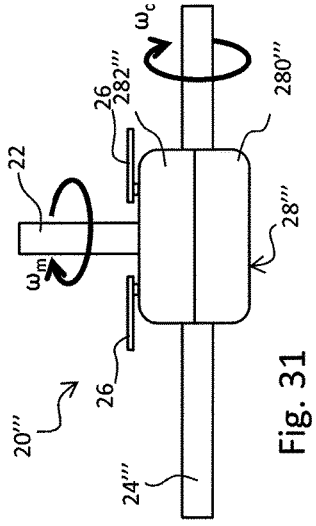

COMPACT CLUTCH

RELATED APPLICATIONS

This is a continuation-in-part of U.S. application Ser. No. 14/848,847, filed Sep. 9, 2015, which claims priority to Italian Application No. MI2014A001587, filed Sep. 15, 2014, the contents of which are herein incorporated by reference.

FIELD OF THE INVENTION

The present invention relates to a compact clutch designed to connect together a driving shaft and a driven shaft, and in particular relates to a compact clutch suitable for installation on small operating machines. The present invention also relates to a drive comprising this compact clutch. The most typical sector for use of the invention is the sector of machines for horticulture or gardening, for example lawn mowers. However, it may be validly used also in other sectors and the person skilled in the art will have no difficulty in extending the scope thereof to the other machines on which it may be used.

BACKGROUND

Basic aspects of the clutch type of focus herein are generally known. To that end, and for easier understanding of the invention, a known form of such clutch type will be described below in detail with reference to FIGS. 1-9 hereof. Such clutch is denoted in its entirety by the reference number 30 and is usually included in a drive 20. The drive 20 comprises a driving shaft 22, connected to a motor, and a driven shaft 24, connected to the mechanical means which must be moved, typically the driving wheels.

As schematically shown in FIGS. 1-5, the drive 20 comprises in a manner known per se a control device 26 which is movable between a working position and a rest position and which allows the operator to connect or disconnect the driving shaft 22 and the driven shaft 24. This possibility of connecting and disconnecting the two shafts is provided precisely by the clutch 30.

Moreover, the drive 20 as a whole is preferably designed to define a ratio between the angular speed $\omega_m$ of the driving shaft 22 and the angular speed $\omega_c$ imparted to the driven shaft 24.

The clutch 30 (see FIGS. 8 and 9) comprises a driving bush 34 which is rigidly connected to the gear wheel 32 by means of axial pins 324. The driving bush therefore is rotated directly by the motor via the driving shaft 22 and, for example, a worm (not shown in the attached figures) which engages the gear wheel 32.

Next to the driving bush 34 there is a driven bush 36 which is rigidly connected to the driven shaft 24 by a pin 364. A coil spring 38, the ends 380 and 382 of which project radially outwards, is wound around the two bushes 34 and 36. A first collar 40 is arranged around the coil spring 38 and comprises a first recess 400 adapted to receive the first end 380 of the coil spring 38. The first collar 40 also comprises, on its radially outer surface, cam surfaces 404. A second collar 42 is also arranged around the first collar 40 and comprises a second recess 420 adapted to receive the second end 382 of the coil spring 38. The second collar 42 also comprises, on its radially inner surface, cam surfaces 424 which are adapted to cooperate with the cam surfaces 404 of the first collar 40.

In the rest configuration of the drive 20, i.e. when the operator does not operate the control device 26, the internal diameter of the coil spring 38 is slightly greater than the external diameter of the two bushes 34 and 36. In such configuration a fork (not shown in the drawings) pushed by a spring (not shown in the drawings) maintains the second collar 42 axially close to the first collar 40. The cam surfaces 424 and 404 convert the axial relative movement into a circumferential relative movement of the first collar 40 and the second collar 42. This rotation is also transmitted to the ends 380 and 382 of the coil spring 38. More specifically, the rotation thus obtained is in the direction of unwinding of the coil spring 38 and therefore results in an increase in the internal diameter of the latter. The coil spring 38 therefore surrounds the two bushes 34 and 36, maintaining them independent of each other. The rotational movement of the driving shaft 22 therefore causes rotation of the gear wheel 32 and, along with it, the driving bush 34 which rotates freely inside the coil spring 38. In this configuration, which is schematically shown in FIGS. 1 and 2, no other part of the clutch 30 is rotated.

Conversely, when the user decides to bring drive 20 in the working configuration, he acts on the control device 26 which releases the fork (not shown in the drawings) such that the second collar 42 axially moves away from the first collar 40. As a matter of fact, without the push of the fork, the coil spring 38 tends to go back to its non-deformed state and the relative rotation between its two ends 380 and 382 implies a circumferential relative movement between the first collar 40 and the second collar 42. The cam surfaces 424 and 404 convert the circumferential relative movement into an axial relative movement by which the two collars part from each other. More specifically, the rotation thus obtained is in the direction of winding of the coil spring 38 and therefore results in a reduction in the internal diameter of the latter. The coil spring 38 therefore tightens around the two bushes 34 and 36, rigidly connecting them together by means of friction. Since the driven bush 36 is rigidly connected to the driven shaft 24, the latter is also caused to rotate. It should be noted that the rotation of the driven bush 34 is usually oriented in such way that it also tends to wind the coil spring 38, thus increasing the friction effect. This configuration is schematically shown in FIGS. 3-5.

When the operator then decides to set the drive 20 back to the rest configuration, he/she again operates the control device 26 so as to re-establish the axial thrust on the second collar 42. This thrust therefore allows the collars 40 and 42 to return into their initial positions, also bringing the ends 380 and 382 of the coil spring 38 into their respective initial rest positions. The relative rotation resulting therefrom is in a direction opposite to the direction of winding of the coil spring 38 and therefore results in an increase in the internal diameter of the latter. The coil spring 38 therefore ceases to be tightened around the two bushes 34 and 36, so that they become again independent of each other.

The drive 20 which comprises the clutch 30 described above is contained inside a housing 28 which comprises a box 280 and a lid 282 and from which housing 28 only the driving shaft 22, the driven shaft 24 and the control device 26 protrude. This configuration allows very small overall dimensional values to be obtained, in particular with regard to the power transmitted. Moreover, with this particular type of clutch it is possible to achieve the result that the force required to operate the control device 26 is entirely independent of the power transmitted, the force of the coil spring 38 and/or any other force associated with operation of the clutch. In practical terms, the control device 26 is usually provided with its own return spring, the force of which is designed to provide the user with a clear indication of the return action, but without this however creating unnecessary fatigue.

The clutch 30 described above, while being widely used, is not without defects. Firstly, as seen above, the clutch 30 as a whole is axially constrained along the driven shaft 24 only by means of the pin 364 of the driven bush 36. This has the effect that the walls of the housing 28 play a more important role than simply that of containing the components and the associated lubrication oil. The walls of the housing 28, as is referenced in FIG. 5 and which can be further seen in FIG. 7, define a constraint in the axial direction for the components of the clutch 30 which bear against it by means of special washers 23. In addition, it must also be considered that the particular transmission of the movement by means of the worm and the gear wheel 32 gives rise to an axial thrust along the driven shaft 24. This thrust is such that the bearing action of the clutch against the walls of the housing 28 is not only fortuitous, but on the contrary systematic, constant and relatively energetic during operation of the drive 20.

As a result, with prolonged operation of the drive 20, a considerable amount of wear on the walls of the housing 28 and/or the washers may be noted. This wear usually gives rise to axial play which, in the long run, has an adverse effect on operation of the clutch 30 and of the entire drive 20.

It has been noted, in fact, that an elongation of the coil spring 38 in the axial direction results in a reduction in the torque which may be transmitted from the driving bush 34 to the driven bush 36 and therefore, ultimately, a reduction in the torque which may be transmitted by the drive 20 as a whole. However, the most serious malfunction which may occur as a result of the formation of this axial play is that a coil of the coil spring 38 may become wedged between the two bushes 34 and 36. In this case, operation of the drive 20 is definitively compromised and the drive must be replaced.

There are also a number of drawbacks of a logistical nature. As may be noted from FIGS. 5 to 7, the box 280 comprises two holes for receiving the driven shaft 24. The holes are formed in the wall of the box so as to be completely contained within it. The shape of these holes allows insertion of the shaft 24 only in the axial direction and a precise assembly sequence of the drive 20 is required. Firstly, the entire clutch 30, with the sole exception of the driven shaft 24, must be assembled. Then the clutch 30 must be positioned inside the box 280. At this point the shaft 24 may be inserted axially, in succession, through a first hole in the box 280, through the clutch 30 and through the second hole in the box 280. Only at this point may the pin 364, which keeps the whole assembly in position, be inserted. Before insertion of the pin 364, the clutch 30 is subject to undesirable disassembly operations which make the assembly step relatively complex. Then the driving shaft 22 with the respective worm and the control device 26 with the respective fork are mounted, and, once the lubrication oil for the mechanical components has been added, the lid 282 is mounted so as to close the box 280 of the housing 28.

From this assembly sequence it can be immediately understood why there are no other axial retaining means apart from the pin 364. Moreover, the drive 20 described above must necessarily be provided in its definitive configuration because this is the only one able to ensure sufficient resistance to accidental disassembly.

A further drawback of this known constructional form of the clutch 30 arises from the need to provide a hole for the pin 364 in the driven shaft 24. Following correct definition of the dimensions of the pin 364, it is required in some cases to form a hole with a diameter equal to nearly one third of the diameter of the driven shaft 24. The resistant cross-section of the driven shaft 24 is therefore locally reduced and the shaft as a whole is significantly weakened (see in this connection FIG. 9).

The object of the present invention is therefore to overcome at least partially the drawbacks mentioned above with reference to the prior art.

BRIEF SUMMARY OF EMBODIMENTS OF THE INVENTION

In particular, a task of the present invention is to provide a compact clutch which is resistant to wear and robust.

Another task of the present invention is to provide a compact clutch and drive which allow greater flexibility in terms of supply compared to the known constructional forms.

The object and the tasks indicated above are achieved by a clutch according to Claim 1 and by drives according to Claims 3 and 5.

BRIEF DESCRIPTIONS OF DRAWINGS

The characteristic features and further advantages of the invention will become clear from the descriptions, provided hereinbelow, of a number of examples of embodiment, provided by way of a non-limiting example, with reference to the accompanying drawings.

FIG. 1 shows in schematic form a plan view of a drive according to the prior art in a rest configuration;

FIG. 2 shows an elevation view of the drive according to FIG. 1;

FIG. 3 shows in schematic form a plan view of a drive according to the prior art in a working configuration;

FIG. 4 shows an elevation view of the drive according to FIG. 3;

FIG. 5 shows a perspective view of a drive according to the prior art in a working configuration;

FIG. 6 shows a perspective view in which a drive according to the prior art has been disassembled in order to show the compact clutch;

FIG. 7 shows a plan view in which a drive according to the prior art has been disassembled in order to show the compact clutch;

FIG. 12 shows an exploded view of a compact clutch according to the invention;

FIG. 13 shows an axially sectioned view of a compact clutch according to the invention;

FIG. 15 shows a drive according to the invention in a view similar to that shown in FIG. 2;

FIG. 16 shows a drive according to the invention in a view similar to that shown in FIG. 4;

FIG. 20 shows an axially sectioned view of a double clutch according to the invention;

FIG. 21 shows an axialy sectioned view of another double clutch according to the invention;

FIG. 22 shows in schematic form a plan view of a double drive according to the invention in a rest configuration;

FIG. 23 shows an elevation view of the drive according to FIG. 22;

FIG. 24 shows in schematic form a plan view of the double drive of FIG. 22 in a working configuration;

FIG. 25 shows an elevation view of the drive according to FIG. 24;

FIG. 26 shows in schematic form a plan view of another double drive according to the invention in a rest configuration FIG. 27 shows an elevation view of the drive according to FIG. 26;

FIG. 28 shows in schematic form a plan view of the double drive of FIG. 26 in a working configuration;

FIG. 29 shows an elevation view of the drive according to FIG. 28;

FIG. 30 shows in schematic form a plan view of the double drive of FIG. 26 in a mixed configuration;

FIG. 31 shows an elevation view of the drive according to FIG. 30; and

DETAILED DESCRIPTION OF EMBODIMENTS OF THE INVENTION

Figure 8:
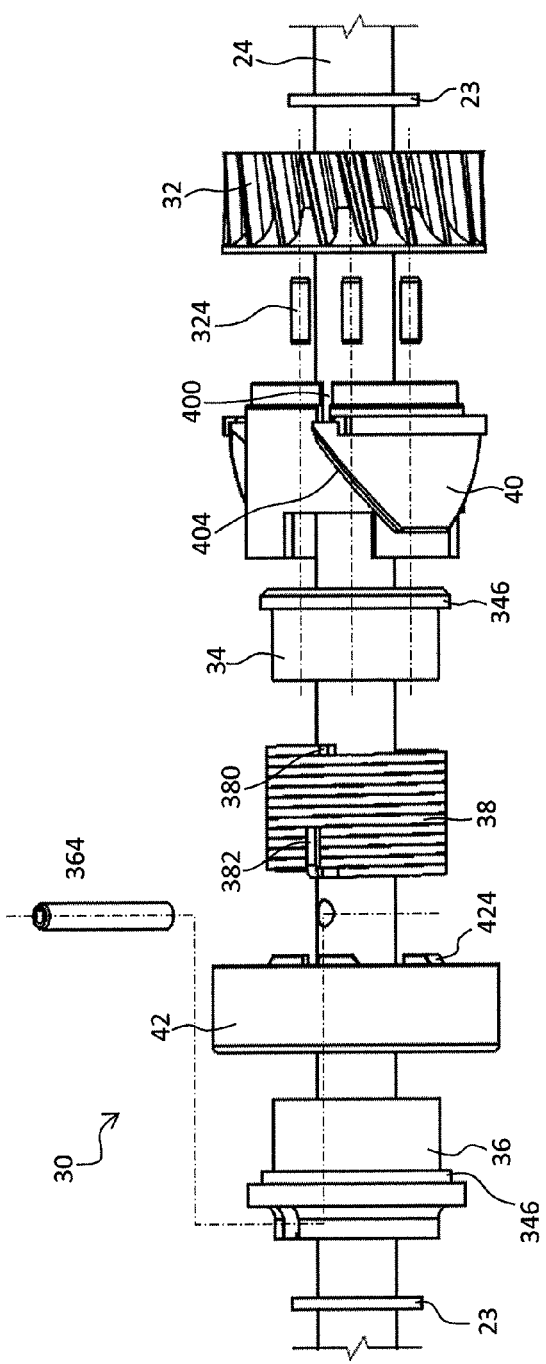
FIG. 8 shows an exploded view of a compact clutch according to the prior art.
Figure 9:
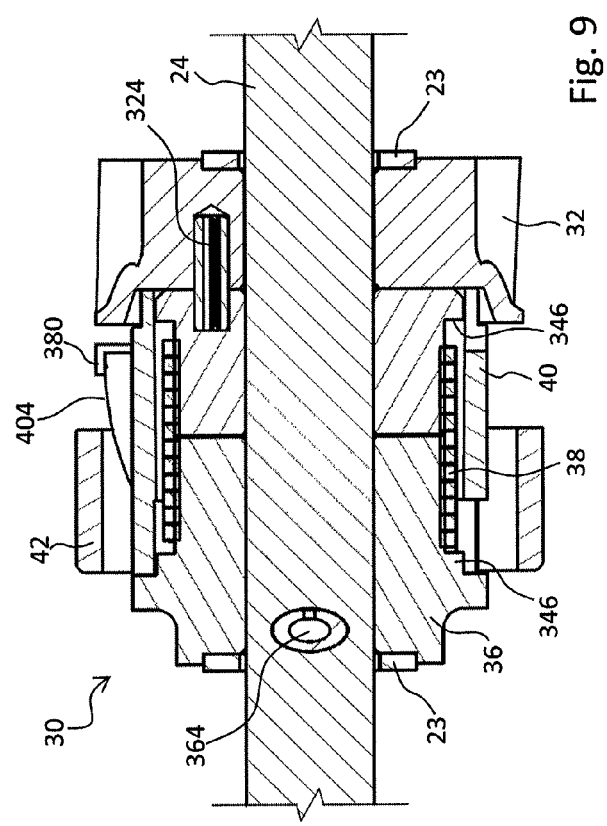
FIG. 9 shows an axially sectioned view of a compact clutch according to the prior art.
Figure 11:
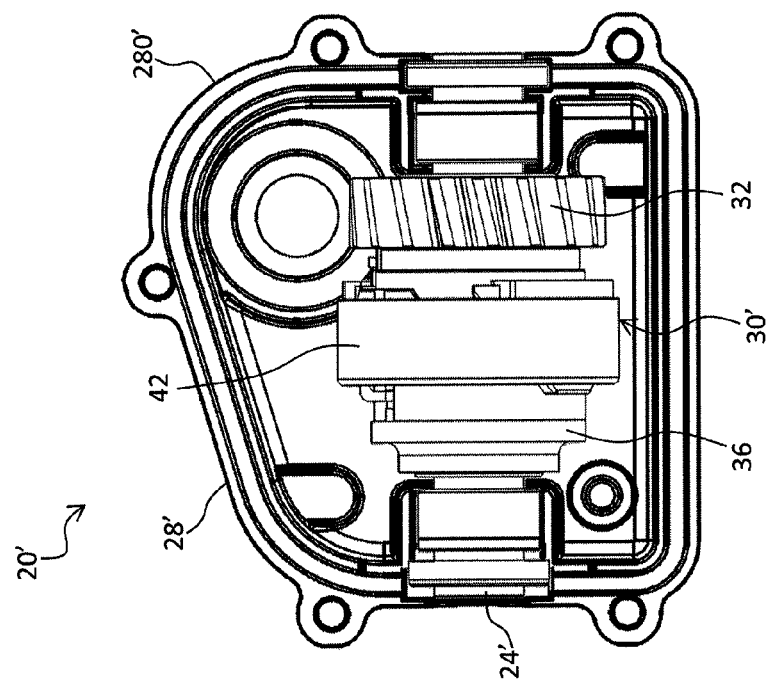
FIG. 11 shows a plan view in which a drive according to the invention has been disassembled in order to show the compact clutch.
Figure 10:
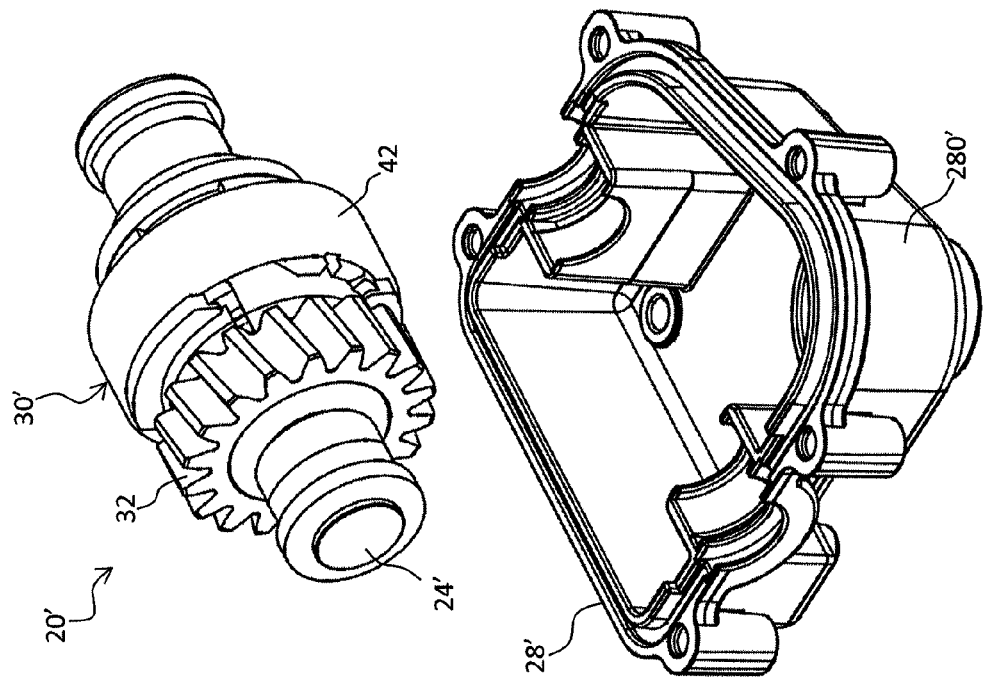
FIG. 10 shows a perspective view in which a drive according to the invention has been disassembled in order to show the compact clutch.
Figure 14:
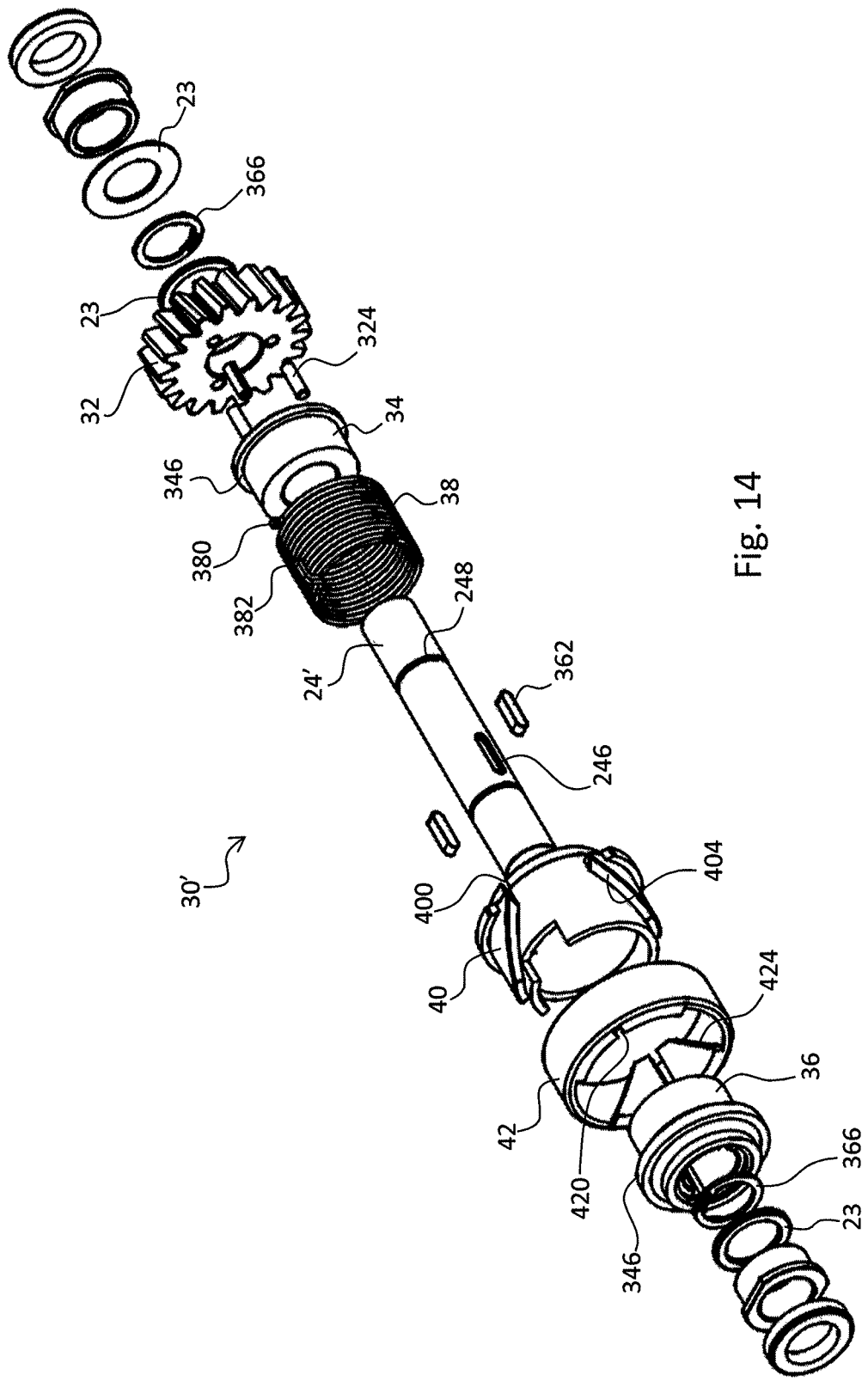
FIG. 14 shows an exploded perspective view of a compact clutch according to the invention.

With reference to FIGS. 10-16, 30' denotes in its entirety a clutch according to the invention. The clutch 30' comprises a driven shaft 24' on which the following are mounted:
- a gear wheel 32;
- a driving bush 34;
- a driven bush 36;
- a coil spring 38 with two ends 380, 382;
- a first collar 40 comprising a first recess 400 and, on its radially outer surface, cam surfaces 404;
- a second collar 42 comprising a second recess 420 and, on its radially inner surface, cam surfaces 424;

In the compact clutch 30':
the gear wheel 32, the driving bush 34 and the driven bush 36 are arranged axially next to each other;
the gear wheel 32 and the driving bush 34 are constrained together in the circumferential direction;
the driving bush 34 and the driven bush 36 have the same external diameter;
the coil spring 38 has, in the rest condition, an internal diameter slightly greater than the external diameter of the driving bush 34 and the driven bush 36;
the coil spring 38 surrounds externally the driving bush 34 and the driven bush 36;
the first collar 40 surrounds externally the coil spring 38 and the first recess 400 receives the first end 380 thereof; and
the second collar 42 surrounds externally the first collar 40 and the second recess 420 receives the second end 382 of the coil spring 38.

The second collar 42 may be displaced in an axial direction between a rest position and a working position;
when the second collar 42 is in the rest position the coil spring 38 is in the rest condition;
when the second collar 42 is displaced into the working position:
the cam surfaces 404, 424 convert the axial displacement of the second collar 42 into a relative rotation between the first collar 40 and the second collar 42;
the relative rotation between the first collar 40 and the second collar 42 produces a relative rotation between the first end 380 and of the second end 382 of the coil spring 38;
the relative rotation between the first end 380 and of the second end 382 produces a tightening of the coil spring 38 around the driving bush 34 and the driven bush 36;
the tightening of the coil spring 38 constrains together by means of friction the driving bush 34 and the driven bush 36.

The compact clutch 30' according to the invention is characterized in that
the gear wheel 32, the driving bush 34 and the driven bush 36 are constrained to the driven shaft 24' in the axial direction by means of two stop rings 366; in that
the driven bush 36 is constrained to the driven shaft 24' in the circumferential direction by means of at least one tongue 362; and in that
the at least one tongue 362 ensures engagement between the driven bush 36 and the driven shaft 24' in the circumferential direction, while in the axial direction the driven bush 36 may slide with respect to the driven shaft 24' at least on one side.

As the person skilled in the art may easily understand, the driven shaft 24' of the clutch 30' unambiguously defines an axis of rotation X. In the present discourse, both as regards the description of the prior art and as regards the description of the invention, a number of agreed terms have been used. "Axial" is understood as referring to the direction of any straight line parallel to the axis X. "Radial" is understood as referring to the direction of any half-line having its origin on the axis X and being perpendicular thereto. "Circumferential" is understood as referring to the direction of any circumference centred on the axis X and situated in a plane perpendicular thereto.

As mentioned above, the gear wheel 32 and the driving bush 34 are constrained together in the circumferential direction so that the rotation of one necessarily causes the rotation of the other one. Said gear wheel and driving bush, on the other hand, are not directly constrained in the direction circumferential with respect to the shaft 24'. As a result, when the coil spring 38 is in the rest configuration, the gear wheel 32 and the driving bush 34 rotate freely around the shaft 24'. Similarly, the driving bush 34 and the driven bush 36 are only arranged next to each other and, when the coil spring 38 is in the rest configuration, they rotate freely with respect to each other around the shaft 24'.

As already mentioned above, the driven bush 36 is constrained to the driven shaft 24' in the circumferential direction by means of at least one tongue 362. In accordance with the embodiment shown in FIGS. 12 to 14, the driven bush 36 is constrained to the driven shaft 24' in the circumferential direction by means of two tongues 362 which are arranged at 180° with respect to each other. The at least one tongue 362 is partially seated inside a suitable recess 246 formed on the outer surface of the driven shaft 24'. The remaining part of the tongue 362 which projects radially from the recess 246 is seated inside a suitable groove 368 formed in the internal diameter of the driven bush 36. As the person skilled in the art may easily understand, therefore, the at least one tongue 362 ensures engagement between the driven bush 36 and the driven shaft 24' in the circumferential direction, while in the axial direction the two parts may slide relative to each other at least in one sense (if for example the grooves 368 are blind) or also in both senses (if for example the grooves 368 are through-grooves).

The driving bush 34 and the driven bush 36 are therefore arranged next to each other where they have the same external diameter (see in particular the cross-section in FIG. 13). As the person skilled in the art may easily note, in the embodiment shown in the attached figures, each of the two bushes also comprises at least one shoulder 346, in the zones situated far from the other bush. These shoulders 346 are preferably provided to allow easy positioning of the other parts around the two bushes, such as the coil spring 38 and the collars 40 and 42. The shoulders 346 define therefore respective different external diameters, which are typically greater, compared to the external diameter of the two bushes which was considered before, for example in relation to the internal diameter of the coil spring 38.

The coil spring 38 has, in the rest condition, an internal diameter slightly greater than the external diameter of the driving bush 34 and the driven bush 36. In the rest condition of the coil spring 38, the bushes 34 and 36 may therefore rotate freely inside it.

When the drive 20' and the clutch 30' are in the rest configuration, the gear wheel 32 transmits its rotary movement to the driving bush 34 alone which freely rotates around the driven shaft 24' and inside the coil spring 28. The driven bush 36 is instead rigidly connected in the circumferential direction to the driven shaft 24', while the coil spring 38 is constrained in the circumferential direction by means of its two ends 380 and 382 to the first collar 40 and to the second collar 42.

When, instead, the operator decides to set the drive 20' and the clutch 30' to the working configuration, he/she operates the control device 26 so as to release the axial thrust applied by the fork (not shown) onto the second collar 42 such that it axially moves away from the first collar 40. As a matter of fact, the coil spring 38 goes back to its non-deformed state, thus causing the axial and circumferential movements between the second collar 42 and the first collar 40. When the two ends 380 and 382 of the coil spring 38 rotate with respect to each other in the direction of winding of the coil spring 38, the deformation tends to reduce the internal diameter of the said spring. The reduction in the internal diameter of the coil spring 38 which is thus obtained causes the latter to tighten around the two bushes 34 and 36 to the point of rigidly connecting them together by means of friction.

In the working configuration, therefore, the tightening of the coil spring 38 around the two bushes 34 and 36 rigidly connects together all the members in the circumferential direction and therefore causes the rotation of the gearwheel 32 to be transmitted to all other members and in particular to the driven shaft 24'.

Finally, when the action of the control device 26 ends, the axial thrust on the second collar 42 is re-established by the fork. Thus the second collar 42 returns into its rest configuration together with the coil spring 38 which assumes again an internal diameter slightly greater than the external diameter of the bushes 34 and 36. The bushes are therefore disengaged again from each other.

The embodiment shown is configured so that the rotation of the gear wheel 32 and of the driving bush 34 are directed precisely in the direction of winding of the coil spring 38. In this way the action itself of the driving bush 34 assists tightening of the coil spring 38 and increases the rapidity and the gripping force of the latter on the bushes 34 and 36.

As already mentioned above, in the compact clutch 30' according to the invention, the axial position on the driven shaft 24' of the gear wheel 32, the driving bush 34 and the driven bush 36 is constrained by means of two stop rings 366. More particularly, a first stop ring 366 forms a stop in the axial direction for the assembly consisting of the gear wheel 32 and the driving bush 34. The driven bush 36 bears against this assembly in the axial direction and in turn is also kept in position by a second stop ring 366.

The assembly consisting of the gear wheel 32 and the two bushes is therefore constrained axially to the driven shaft 24'. Since the assembly formed by the coil spring 38 and by the two collars 40 and 42 is in turn constrained to the bushes 34 and 36 (for example by means of the shoulders 346 of the latter), the entire clutch 30' is axially constrained to the output shaft 24'.

The two stop rings 366 may assume different forms, provided that they are able to ensure the axial stability of the clutch. These rings may for example be a seeger ring or benzing ring, which are well known to the person skilled in the art.

In accordance with a further aspect, the invention also relates to the drive 20' comprising the compact clutch 30'. The drive 20' also comprises a housing 28' having in turn a box 280' and a lid 282'. In the drive 20' according to the invention, the driven shaft 24' protrudes from the housing 28' at the joint between the box 280' and the lid 282'.

In other words, the holes through which the driven shaft 24' protrudes from the housing 28' are formed half in the wall of the box 280' and half in the wall of the lid 282'. As the person skilled in the art may easily understand, this configuration of the holes allows the insertion and removal of the shaft 24' in the radial direction rather than in the axial direction, as occurred in the prior art.

Preferably the drive 20' also comprises a control device 26 designed to move between a rest position and a working position. In the rest position the control device applies a thrust to the compact clutch 30' maintaining the latter in its rest configuration. In the working position, instead, the control device 26 releases any thrust on the second collar 42 which is brought into the working position, thus producing fastening together of the bushes 34 and 36.

The control device 26 preferably comprises an external lever 260 which operates an auxiliary shaft 262 connected to a fork inside the housing 28'. The fork is adapted to apply an axial thrust to the second collar 42, even when the latter is rotated.

The control device 26 advantageously comprises return means, for example a spring (not shown) acting on the lever 260. In this way some advantages are obtained. Firstly, operation of the control device 26 by the user must overcome the action of the spring and this provides the user with an important indication of the return movement of the control device 26. Also the force of the spring action may be defined so as to satisfy specific needs, entirely independently of the power which is transmitted via the drive 20'. Finally the spring of the control device 26 assists the drive 20' as a whole to return into the rest configuration once the user no longer exerts an action on the said control device 26.

The housing 28' of the drive 20' is furthermore advantageously adapted to receive, in addition to the mechanical components described above, also the lubricant necessary for ensuring correct operation thereof.

Figure 17:
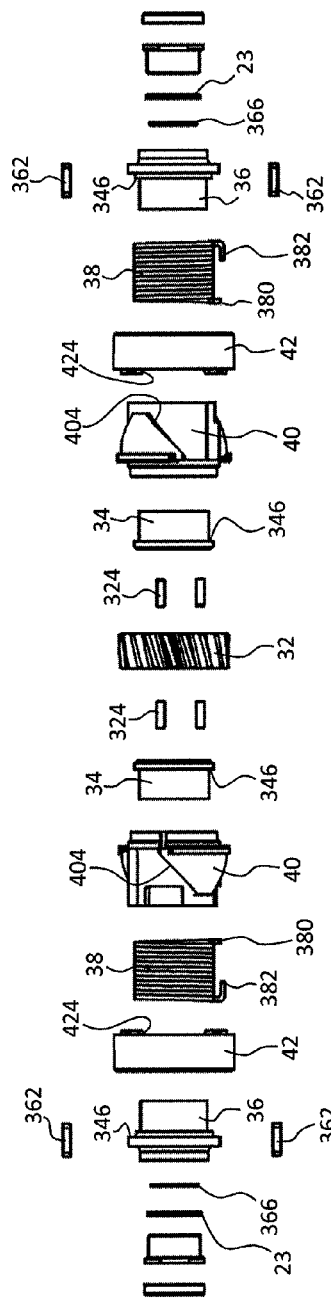
FIG. 17 shows an exploded view of a double clutch according to the invention.
Figure 18:
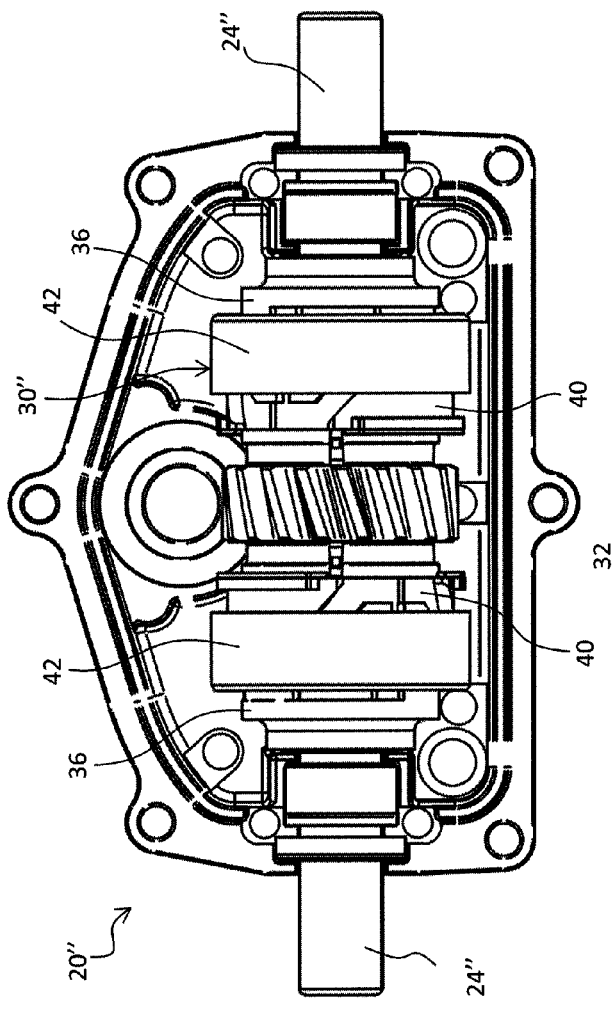
FIG. 18 shows a double drive according to the invention, in a plant disassembled view similar to the one of FIG. 11.
Figure 19:
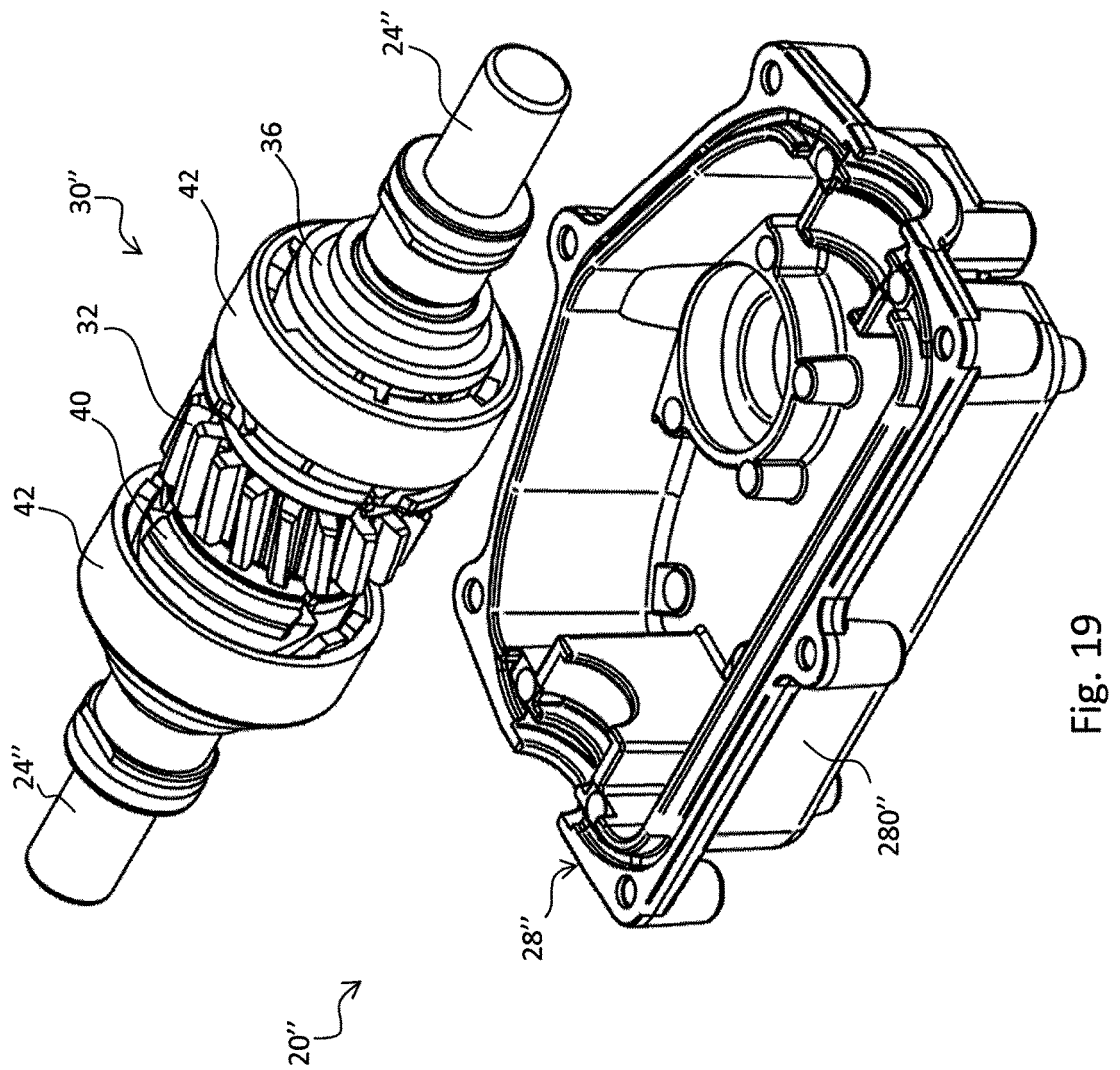
FIG. 19 shows another drive according to the invention, in a perspective disassembled view similar to the one of FIG. 10.
Figure 32:
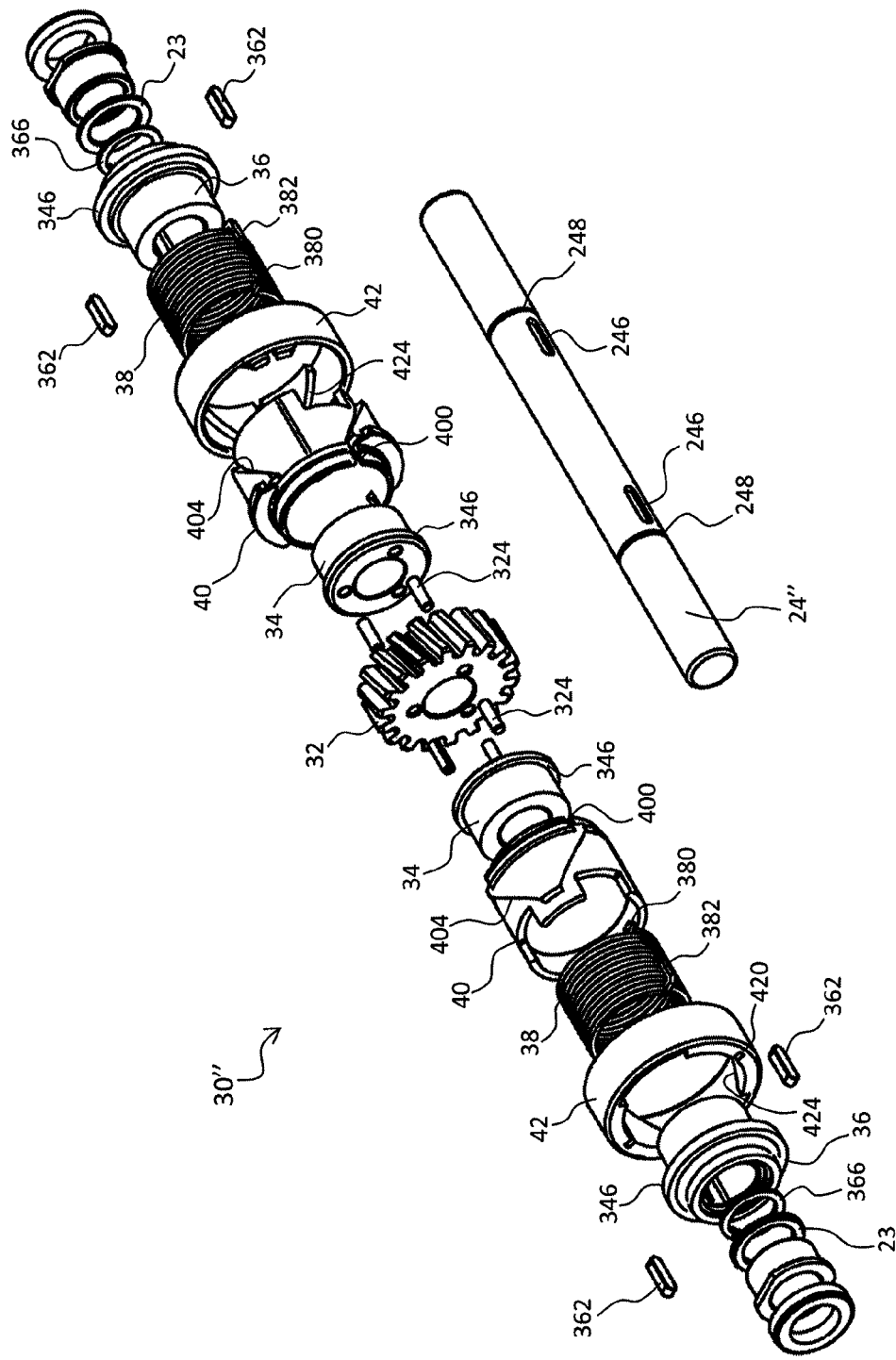
FIG. 32 shows a view similar to the one of FIG. 14 of a double clutch according to the invention.

With reference to FIGS. 17 to 32, other embodiments will be now disclosed regarding double clutches 30", 30'" and of corresponding drives 20", 20'" further according to the invention. In such embodiments, the double clutches 30", 30'" are derived by duplicating components in a symmetrical manner on both sides of the gear wheel 32. As can be clearly appreciated from the figures (see in particular FIGS. 17, 20, and 21) such embodiments comprise at least one driven shaft 24" or 24" 'and, on both sides of the gear wheel 32:

two driving bushes 34;
two driven bushes 36;
two coil springs 38 each having two ends 380, 382;
two first collars 40 each comprising a first recess 400 and, on its radially outer surface, cam surfaces 404;
two second collars 42 each comprising a second recess 420 and, on its radially inner surface, cam surfaces 424.

Also in the double clutch embodiments according to the invention, like in the single ones described above:

the gear wheel 32, the two driving bushes 34 and the two driven bushes 36 are arranged axially next to each other;
the gear wheel 32 and the two driving bushes 34 are constrained together in the circumferential direction;
the driving bushes 34 and the driven bushes 36 have the same external diameter;
the two coil springs 38 have, in the rest condition, an internal diameter slightly greater than the external diameter of the driving bushes 34 and delle driven bushes 36;
each one of the two coil springs 38 surrounds externally the driving bush 34 and the respective driven bush 36;
each first collar 40 surrounds externally the respective coil spring 38 and the first recess 400 receives the first end 380 thereof; and
each second collar 42 surrounds externally the respective first collar 40 and the second recess 420 receives the second end 382 of the respective coil spring 38.

Each one of the second collars 42 may be displaced in an axial direction between a rest position and a working position;

when the second collars 42 are in the rest position the coil springs 38 are in the rest condition;
when at least one second collar 42 is displaced into the working position:
the cam surfaces 404, 424 convert the axial displacement of the second collar 42 into a relative rotation between the respective first collar 40 and the second collar 42 itself;
the relative rotation between the first collar 40 and the respective second collar 42 produces a relative rotation between the first end 380 and the second end 382 of the respective coil spring 38;
the relative rotation between the first end 380 and the second end 382 produces a tightening of the coil spring 38 around the respective driving bush 34 and the respective driven bush 36;
the tightening of the coil spring 38 constrains together by means of friction the driving bush 34 and the driven bush 36.

The double clutches 30", 30'" according to the invention are characterized in that the gear wheel 32, the driving bushes 34 and the driven bushes 36 are constrained to the at least one driven shaft 24", 24'" in the axial direction by means of two stop rings 366; in that
each one of the two driven bushes 36 is constrained to the at least one driven shaft 24", 24'" in the circumferential direction by means of at least one tongue 362; and in that the at least one tongue 362 ensures engagement between the respective driven bush 36 and the at least one driven shaft 24", 24'" in the circumferential direction, while in the axial direction each driven bush 36 may slide with respect to the at least one driven shaft 24", 24'" at least on one side.

The double clutch 30", 30'" according to the invention preferably comprises two different control devices 26, one for each side.

In the double clutch 30", 30'" according to the invention, the two coil springs 38 preferably have winding directions opposite the one to the other.

In accordance with some embodiments, the double clutch 30" according to the invention comprises one driven shaft 24" only. Such embodiments are shown for example in FIGS. 20, 22-25, and 32. According to these embodiments, the two control devices 26 can be advantageously arranged in such a manner that one action only of the user causes the movement of both the levers 260. For example the configuration of the control devices 26 shown in FIGS. 22-25 permits to obtain the movement of both the levers 260 by applying the control action on the left lever only. In such case during the counterclockwise rotation which brings it from the position of FIG. 22 to the one of FIG. 24, the left lever also pushes the right lever, imposing to the latter an analogous clockwise rotation.

These embodiments provide a drive 20" adapted to transmit a double torque with respect to the single drive previously described, with an overall size smaller than the double. This type of double drive 30" according to the invention is therefore particularly efficient in transmitting the driving torque. In accordance with other embodiments, the double clutch 30'" according to the invention comprises two driven shafts 24'", butt adjoined to each other and arranged in a coaxial manner. Such embodiments are shown for example in FIGS. 21 and 26-31.

As the skilled person can easily appreciate in FIG. 21, the gear wheel 32 is preferably placed astride the butt joint between the two driven shafts 24'". Therefore on each one of the two driven shafts 24'" are mounted, in a mirror-like manner with respect to the gear wheel 32: a driving bush 34, a driven bush 36, a coil spring 38, a first collar 40, and a second collar 42. Such components are arranged and related the one with the others in accordance with what has been already described previously.

According to these embodiments, the two control devices 26 are advantageously arranged in such a manner that they can be operated independently the one from the other by a user. For example the configuration of the control devices 26 shown in FIGS. 26-31 permits to obtain an independent movement for each one of the two levers 260. By applying the control action on both the levers (FIGS. 28 and 29) the rotation is obtained of both the shafts 24'", while applying the control action on one lever only (for example the right one in FIGS. 30 and 31) the rotation is obtained of the corresponding shaft only (i.e. the right one in FIGS. 30 and 31).

The embodiments with two driven shafts 24'" provide a drive 20'" adapted to transmit the driving torque either to one shaft only or to both shafts, according to the desire of the user. This type of double drive 30'" according to the invention is therefore suitable for uses in which the possibility is required of driving two elements, for example two wheels, in a differential manner.

As the person skilled in the art would likely understand, the clutches 30', 30", 30'" and their corresponding drives 20', 20''', 20'''' according to the invention would overcome the drawbacks mentioned above with reference to the prior art.

Firstly the clutches 30', 30'', 30''' according to the invention maintain all the advantageous characteristic features of the clutch of the known type yet differ in the way in which the different component parts are constrained to the corresponding driven shafts 24', 24'', 24'''. In the clutch 30 according to the prior art, the pin 364 provided a double (axial and circumferential) constraint for the driven bush 36, while there was no axial constraint on the side where the gear wheel 32 is located. For this reason the clutch 30 as a whole was constrained axially by the walls of the housing 28. In the case of wear, this constraint became insufficient and gave rise to play and malfunctioning of the clutch 30 according to the prior art. The clutches 30', 30'', 30''' according to the invention are instead axially constrained by the two stop rings 366 such that, even in the case of wear, the axial constraint remains absolutely identical. In other words, in the drives 20', 20'', 20''' according to the invention, the play which may arise from wear would be confined between the corresponding clutches 30', 30'', 30''' and the walls of the housing 28', 28'', 28''', while it would not arise at all inside the clutches 30', 30'', 30''' themselves. The compact clutches 30', 30'', 30''' according to the invention are therefore more resistant to wear than the clutch 30 according to the prior art.

Moreover, as mentioned above, the provision of the pin 364 according to the prior art resulted in a significant weakening of the driven shaft 24 owing to the hole needed to seat it. Owing to the replacement of the pin with the stop rings 366 on the one hand and the tongues 362 on the other hand, the mechanical characteristics of the driven shafts 24', 24'', 24''' may be maintained practically unchanged. The recesses 248 necessary for receiving the stop rings 366 and the recesses 246 necessary for receiving the tongues 362 are in fact surface incisions which do not reduce substantially the resistant cross-section of the shaft itself These recesses may advantageously comprise suitable fillet radii so as to minimize the effect of stress concentration, in a manner known per se to the person skilled in the art.

Basically, therefore, the present invention provides a compact, wear-resistant and robust clutch 30', 30'', 30''' design.

Moreover, the corresponding drives 20', 20'', 20''' according to the invention wholly allow for greater flexibility during assembly and supply compared to the known constructional forms. In fact, in the drive 20 according to the prior art, the driven shaft 24 protrudes from the housing 28 through the holes formed in the wall of the box 280. This obviously means that assembly of the clutch 30 is dependent on the presence of the box 280. During assembly according to the prior art, firstly the various components of the clutch 30 must be arranged next to each other, then they must be introduced into the box 280 and only at the end may the driven shaft 24 be inserted. The pin 364 is the last part which is assembled and it fastens together the assembly of all the other components which up to that moment are in fact subject to undesirable movements which may also result in disassembly of the clutch 30. In the assembly according to the invention, instead, since the driven shafts 24', 24'', 24''' project from the corresponding housings 28', 28'', 28''' at the joint between the boxes 280', 280'', 280''' and the lids 282', 282'', 282''', the clutches 30', 30'', 30''' may be assembled independently of the corresponding housings 28', 28'', 28''' and introduced radially into the latter subsequently. Moreover, the presence of two axial constraints along the shafts 24', 24'', 24''' (the two stop rings 366) allows handling of the assembled clutches 30', 30'', 30''' without any danger of them becoming disassembled in an unwanted manner.

The clutches 30', 30'', 30''' according to the invention may therefore be pre-assembled and handled without any problems, even without the associated housings 28', 28'', 28'''. As a result of this feature, for example only the compact clutches 30', 30'', 30''' may be supplied where the client wishes to use an existing housing different from that proposed in the drive. This possibility was not contemplated by the solution of the prior art.

As the skilled person can easily understand from the description above, the advantages pointed out can similarly relate both to the single 30' and double 30'', 30''' clutch embodiments and of the corresponding drives 20' and 20'', 20'''.

The person skilled in the art, in order to satisfy specific requirements, may make modifications to the embodiments of the clutches 30', 30'', 30''' and of the corresponding drives 20', 20'', 20''' described above and/or replace the parts described with equivalent parts, without thereby departing from the scope of the accompanying claims.

What is claimed is:

1. Clutch comprising at least one driven shaft on which the following are mounted:
   a gear wheel;
   two driving bushes distributed on opposing sides of the gear wheel;
   two driven bushes distributed on the opposing sides of the gear wheel;
   two coil springs distributed on the opposing sides of the gear wheel, each of the two coil springs having first and second ends;
   two first collars distributed on the opposing sides of the gear wheel, each of the two first collars comprising a first recess and cam surfaces on the collar's radial outer surface;
   two second collars distributed on the opposing sides of the gear wheel, each of the two second collars comprising a second recess and cam surfaces on the collar's radial inner surface;
wherein:
   the gear wheel, the two driving bushes and the two driven bushes are arranged along a common axis;
   the gear wheel and the two driving bushes are constrained together in a circumferential direction;
   the driving bushes and the driven bushes have a same external diameter;
   the two coil springs have, in a rest condition, an internal diameter slightly greater than the external diameter of the driving bushes and of the driven bushes;
   each of the two coil springs externally surrounds corresponding ones of the driving bushes and the driven bushes;
   each of the two first collars externally surrounds corresponding of the two coil springs and the first recesses of the two first collars correspondingly receive the first ends of the two coil springs;
   each of the two second collars externally surrounds corresponding of the two first collars and the second recesses of the two second collars correspondingly receive the second ends of the two coil springs;
   each of the two second collars is displaceable in an axial direction between a rest position and a working position;
   whereby when each of the two second collars are in the rest position the corresponding two coil springs are in a rest condition; and when at least one of the two second collars is displaced into the working position:
    the cam surfaces on the radial inner surface of the at least one second collar convert axial displacement of said at least one second collar into a rotation relative to the corresponding first collar;
    each relative rotation between the at least one second collar and corresponding first collar produces a relative rotation between the first end and the second end of the corresponding coil spring;
    each relative rotation between the first end and the second end of the corresponding coil spring produces a tightening of the same coil spring around corresponding of the driving bushes and the driven bushes;
    the tightening of each coil spring constrains together by means of friction the corresponding of the driving bushes and the driven bushes;
the compact clutch being characterized in that
    the gear wheel, the driving bushes and the driven bushes are constrained to the at least one driven shaft in the axial direction by means of two stop rings; in that
    each of the two driven bushes is constrained to the at least one driven shaft in the circumferential direction by means of at least one tongue; and in that
    the at least one tongue ensures engagement between corresponding of the driven bush and the at least one driven shaft in the circumferential direction, while in the axial direction the corresponding driven bush is slidable at least in one sense relative to the at least one driven shaft.

2. Clutch according to claim 1, wherein the at least one driven shaft comprises two driven shafts butt adjoined and arranged in a coaxial manner.

3. Drive comprising:
    a clutch according to claim 1; and
    a housing comprising a box and a lid;
wherein the at least one driven shaft protrudes from the housing at a joint between the box and the lid.

4. Drive according to claim 3, further comprising two control devices, each of the two control devices moveable between a rest position and a working position in which the two control devices axially move corresponding of the second collars into the working positions and wherein the two control devices are arranged to be operable at a same time with only one action of the user.

5. Drive comprising:
    a clutch according to claim 2;
    a housing comprising a box and a lid;
wherein the two driven shafts protrude from the housing at a joint between the box and the lid.

6. Drive according to claim 5, further comprising two control devices each of the two control devices moveable between a rest position and a working position in which the two control devices axially move corresponding of the second collars into the working positions and wherein the two control devices are arranged to be operable independently.

* * * * *